US012024906B2

(12) United States Patent
Müller

(10) Patent No.: US 12,024,906 B2
(45) Date of Patent: Jul. 2, 2024

(54) MOBILE CONCRETE PUMP AND METHOD FOR STABILIZATION-RELEVANT CONTROL OF A MOBILE CONCRETE PUMP

(71) Applicant: Putzmeister Engineering GmbH, Aichtal (DE)

(72) Inventor: Ansgar Müller, Stuttgart (DE)

(73) Assignee: Putzmeister Engineering GmbH, Aichtal (DE)

( * ) Notice: Subject to any disclaimer, the term of this patent is extended or adjusted under 35 U.S.C. 154(b) by 960 days.

(21) Appl. No.: 16/981,517

(22) PCT Filed: Mar. 15, 2019

(86) PCT No.: PCT/EP2019/056573

§ 371 (c)(1),
(2) Date: Sep. 16, 2020

(87) PCT Pub. No.: WO2019/175400

PCT Pub. Date: Sep. 19, 2019

(65) Prior Publication Data

US 2021/0010281 A1 Jan. 14, 2021

(30) Foreign Application Priority Data

Mar. 16, 2018 (DE) ..................... 10 2018 204 079.6

(51) Int. Cl.
*E04G 21/04* (2006.01)
*B66C 23/94* (2006.01)
(Continued)

(52) U.S. Cl.
CPC ..... *E04G 21/0436* (2013.01); *E04G 21/0445* (2013.01); *B66C 23/78* (2013.01); *B66C 23/905* (2013.01); *B66C 23/94* (2013.01)

(58) Field of Classification Search
CPC . E04G 21/0436; E04G 21/0445; B66C 23/78; B66C 23/905; B66C 23/94
See application file for complete search history.

(56) References Cited

U.S. PATENT DOCUMENTS 6,202,013 B1 3/2001 Anderson et al.
10,099,660 B2 * 10/2018 Mayer ....................... B60S 9/02
2004/0119597 A1 6/2004 Petzold et al.

FOREIGN PATENT DOCUMENTS

DE 10110176 A1 9/2002
DE 10242270 A1 4/2004
(Continued)

OTHER PUBLICATIONS

German Examination Report for German Application No. 10 2018 204 079.6 filed Mar. 16, 2018, Dated: Feb. 6, 2019; 6 pgs.
(Continued)

*Primary Examiner* — Bryan A Evans
(74) *Attorney, Agent, or Firm* — Alix, Yale & Ristas, LLP

(57) ABSTRACT

The invention relates to a mobile concrete pump (10) having a chassis (12) which has extendable supporting legs (14), and a concrete distributor mast (18), which is arranged on a slewing mechanism (16) of the chassis (12) such that the concrete distributor mast can be slewed and the inclination thereof can be adjusted by means of an actuating cylinder (22), and which comprises multiple pivotable mast arms (20), and a computing unit for carrying out a stabilization calculation by using the vertical and/or horizontal forces on at least two supporting legs (14), and having a control device which is configured, depending on stability check, to delimit a slewing movement on the slewing mechanism (16) and/or a pivoting movement of at least one mast arm (20.1, 20.2 20.3) and/or the initiation of a pumping operation.

19 Claims, 6 Drawing Sheets

(51) Int. Cl.
*B66C 23/78* (2006.01)
*B66C 23/90* (2006.01)

(56) References Cited

FOREIGN PATENT DOCUMENTS

| | | | | |
|---|---|---|---|---|
| DE | 10320382 | A1 | 12/2004 | |
| DE | 102004012966 | A1 * | 10/2005 | ............. B66C 23/80 |
| DE | 102004012966 | A1 | 10/2005 | |
| DE | 102012106222 | A1 * | 1/2014 | ............ B66F 11/046 |
| DE | 102012106222 | A1 | 1/2014 | |
| DE | 102014215019 | A1 | 2/2016 | |
| EP | 2038493 | A1 | 3/2009 | |
| EP | 2555067 | A1 | 2/2013 | |
| EP | 2727876 | A1 | 5/2014 | |
| EP | 2733281 | A1 | 5/2014 | |
| EP | 1849931 | B1 | 11/2016 | |
| JP | 08081181 | | 3/1996 | |
| JP | 11171476 | | 6/1999 | |
| JP | 2004526082 | | 8/2004 | |
| JP | 2007254059 | | 10/2007 | |
| JP | 2013523558 | | 6/2013 | |
| JP | 2017530273 | | 1/2018 | |
| JP | 2021515858 | | 6/2021 | |
| KR | 20170038840 | A | 4/2017 | |
| WO | 2008003548 | A1 | 1/2008 | |
| WO | 2016016305 | | 2/2016 | |

OTHER PUBLICATIONS

PCT International Search Report for PCT/EP2019/056573 dated Jul. 1, 2019; 2 pgs.

* cited by examiner

MOBILE CONCRETE PUMP AND METHOD FOR STABILIZATION-RELEVANT CONTROL OF A MOBILE CONCRETE PUMP

BACKGROUND

The present invention relates to a mobile concrete pump and a method for stabilization-relevant control of a mobile concrete pump.

EP 2 733 281 A1 discloses a stabilization-relevant controller, which is based on a calculation of the static center of gravity of the substructure (metacenter). With further use of the center of gravity of the entire vehicle and a limit of safe operation from the specific support configuration, a safety coefficient is determined. The safety coefficient corresponds to the ratio between the distance of metacenter to center of gravity and the distance of center of gravity to safety limit. A safety coefficient greater than one signals safe operation.

A stability controller for concrete delivery vehicles is known from EP 2 555 067 A1, in which the center of gravity of each component is determined to calculate the overall center of gravity of the vehicle therefrom. This is compared to a predetermined balance range, which takes into consideration the support arms in horizontal projection. If the balance range is exceeded, an alarm is output.

EP 2 038 493 A1 discloses a mobile concrete pump having support booms and a control unit for the mast arm movement. The known control unit comprises a software routine responding to a selected support configuration of the support booms, which limits the pivot angle of a first articulated arm around its axis of articulation and an associated rotational angle range of the rotating head around the vertical axis according to the selected support configuration. This is accompanied by shortening of the range of the boom, while the possible radial working range increases for a given support configuration.

A mobile concrete pump having a concrete distributor mast formed from multiple pivotable mast arms and rotatably arranged on a rotating mechanism on a chassis and an inclination sensor for detecting an inclination of the mobile concrete pump is known from DE 10 2014 215 019 A1, in which a safety unit coupled to the inclination sensor is provided for restricting the working range of the concrete distributor mast in dependence on the inclination. The safety unit is configured to limit the rotational movement on the rotating mechanism and/or the pivot movement of at least one mast arm as a function of an inclination of the vehicle.

DE 102 42 270 A1 discloses a lifting platform vehicle in which the range of the lifting platform is limited in consideration of the inclination for safe operation in uneven terrain. For this purpose, the setup inclination of the lifting working platform is detected for its operation using an inclination sensor and a target-actual comparison is performed for permissible ranges with different inclinations in such a way that the greatest range is achieved.

Proceeding therefrom, according to the invention a mobile concrete pump having the features of claim 1 and a method for stabilization-relevant control of a mobile concrete pump having the features of claim 6 are proposed.

SUMMARY OF THE INVENTION

The invention is based on the finding that a stabilization-relevant control of a mobile concrete pump is effectively possible in real time by the calculation of the load torque in the mast arm and the vertical and/or horizontal forces in at least two support legs of the mobile concrete pump. For this purpose, either the vertical and/or horizontal forces are to be measured directly, for example, in the context of a 3D force measurement using suitable sensors, or at least the pressure in the positioning cylinder of the mast arm, the rotating mechanism angle of the mast arm linkage, the support points of the support legs, and the inclination of the concrete pump substructure (i.e., the chassis) are sensorially detected to determine the vertically and/or horizontally acting forces in at least two support legs on this basis.

The invention enables, in consideration of the current support configuration and the machine inclination, a statement about the actual stability reserve of the mobile concrete pump and a so-called pumping statement, i.e., a statement about whether a pumping process can be initiated in the instantaneous machine positioning (mast position, substructure inclination) (in consideration of the finding that a further weight change will occur due to filling of the conveyor pipelines with concrete, which can lead the machine out of the range of the stability reserve).

The present invention also covers a computer program having program code which is capable of executing a method according to the invention when the computer program runs on a computer or a corresponding processing unit, in particular a processing unit of a mobile concrete pump. Both the computer program itself and also the computer program (computer program product) stored on a computer-readable medium are claimed.

Further advantages and designs of the invention result from the description and the appended drawings.

It is apparent that the above-mentioned features and the features to be explained hereinafter are usable not only in the particular specified combination but rather also in other combinations or alone, without leaving the scope of the present invention.

The invention is schematically illustrated in the drawings on the basis of an exemplary embodiment and is described in detail hereinafter with reference to the drawings.

DETAILED DESCRIPTION

Figure 1:
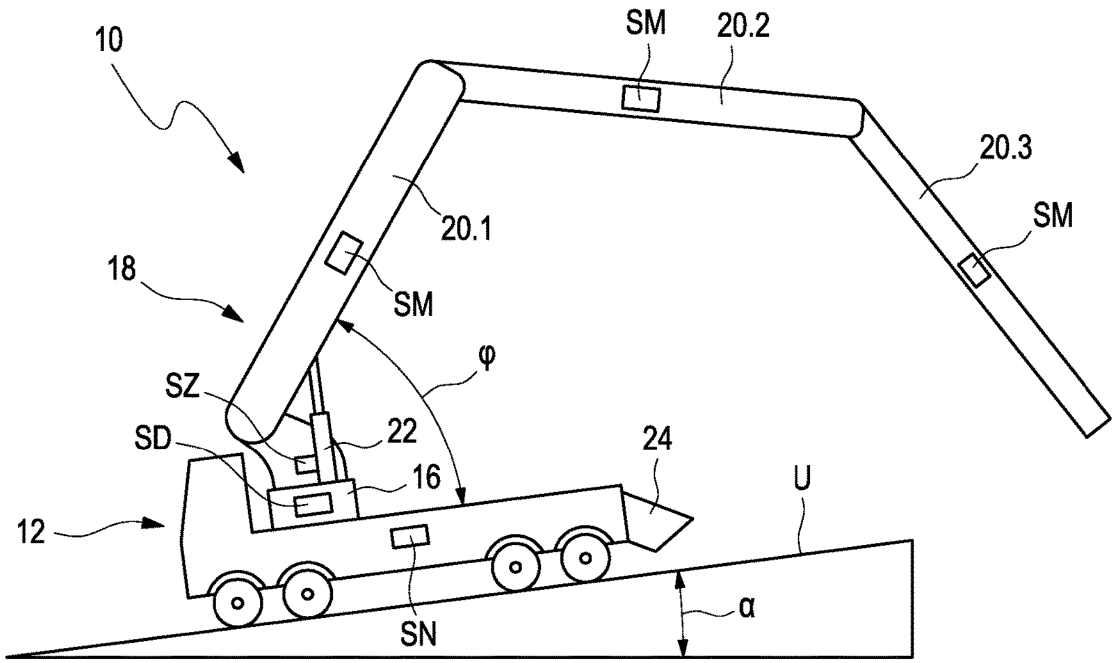
FIG. 1 shows, in a very schematic lateral view, a mobile concrete pump on an inclined underlying surface having pivoted-out mast arms.

FIG. 1 shows, in a very schematic lateral view, a mobile concrete pump 10 according to the invention having a chassis (substructure) 12 and a concrete distributor mast 18 attached via a rotating mechanism 16 to the chassis 12, which comprises pivotable mast arms 20 (in the illustrated exemplary embodiment three mast arms 20.1, 20.2, 20.3). The first mast arm (A arm) 20.1 of the concrete distributor mast 18 is linked by means of a positioning cylinder 22 so it is adjustable in inclination on the rotating mechanism 16. The following mast arms 20.2, 20.3 are correspondingly pivotable with respect to one another by means of positioning cylinders (not shown).

Figure 2:
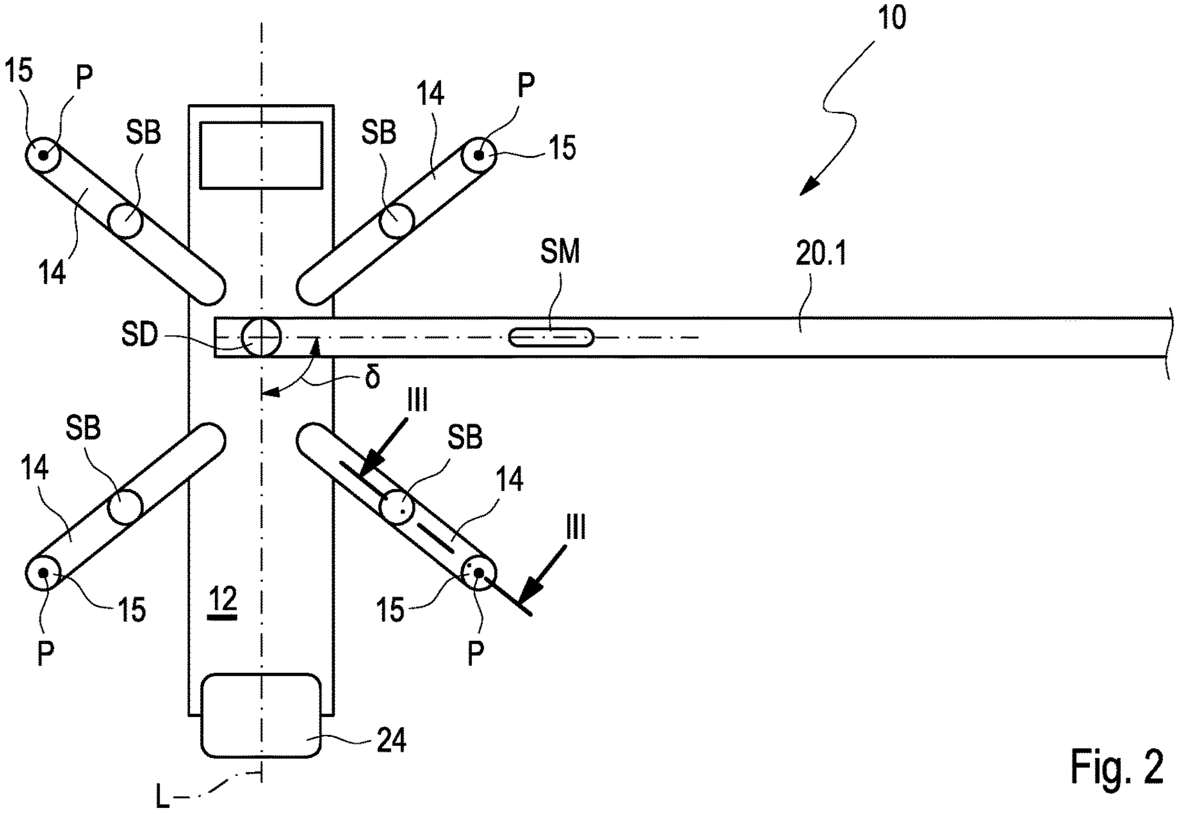
FIG. 2 shows the mobile concrete pump of FIG. 1 in a top view having extended support legs and concrete distributor mast rotated to the side.

For support in operation, the mobile concrete pump 10 has, in a way known per se, four extendable (and possibly adjustable) support legs 14 which can be supported on an underlying surface U using support plates 15 (cf. FIG. 2). Furthermore, a concrete receptacle funnel 24 is provided on the chassis or substructure 12.

The mobile concrete pump 10 according to the invention additionally comprises support sensors SB in the support legs 14 for detecting support points P of the support legs 14, inclination sensors SN for detecting an inclination α of the chassis 12, a rotational angle sensor SD for detecting a rotational angle δ of the rotating mechanism 16, and a sensor SZ for detecting a pressure in the positioning cylinder 22 (cylinder pressure sensor or cylinder force sensor) and also mast angle sensors SM arranged in the mast arms 20 (the opening angle of the first mast arm 20.1 is identified as φ). The detection of the inclination of the chassis 12, thus the angle of inclination of the underlying surface U, is preferably measured along two axes; for reasons of simplified illustration, only one longitudinal angle of inclination α is shown in FIG. 1 (in the plane of section of a longitudinal extension L of the mobile concrete pump 10). In a plane perpendicular to the longitudinal extension L of the mobile concrete pump 10, for example, an inclination by a transverse angle of inclination β can exist (cf. also the following description of FIGS. 3 and 4 in this regard).

Using the invention described in detail hereinafter, stability monitoring of a mobile concrete pump 10 is enabled to avoid incorrect operations during operation of the concrete pump (support of the mobile concrete pump 10 in particular with inclined position, rotating/extending of the concrete distributor mast 18, pumping operation in limiting ranges), which could result in tipping over of the machine 10 or overload of steel components of the machine. According to the invention (at least in a restricted range) it is also possible to work with an increased inclination α, which goes beyond the 3° inclination typically to be maintained.

For this purpose, the following variables are metrologically detected on the basis of suitable sensors: the joint cylinder pressures in the positioning cylinder (or the positioning cylinders) of the distributor mast 18 (or more precisely of the first mast arm 20.1), the rotating mechanism angle δ, the support points of the support legs and the inclination α of the concrete pump substructure (around two axes) and the opening angle of the A joint.

As further variables, the total weight, the substructure weight, and the substructure center of gravity are required, which are incorporated as estimated values in the calculation due to the variability thereof.

Using the cutting forces and the cutting torques between mast 18 and substructure 12 and the mass (mast plus substructure) and the center of gravity of the substructure 12, the support forces in all three dimensions can now be calculated in real-time via a simplified theoretical calculation. The following checks can be carried out using this calculation.

It can be checked how large the fraction of the vertical forces is which can be dissipated only via two support points P. If a limiting value (for example, 95%) is exceeded, the machine is at risk of tipping and all actions have to be avoided which cause the load torque to increase.

Figure 3:
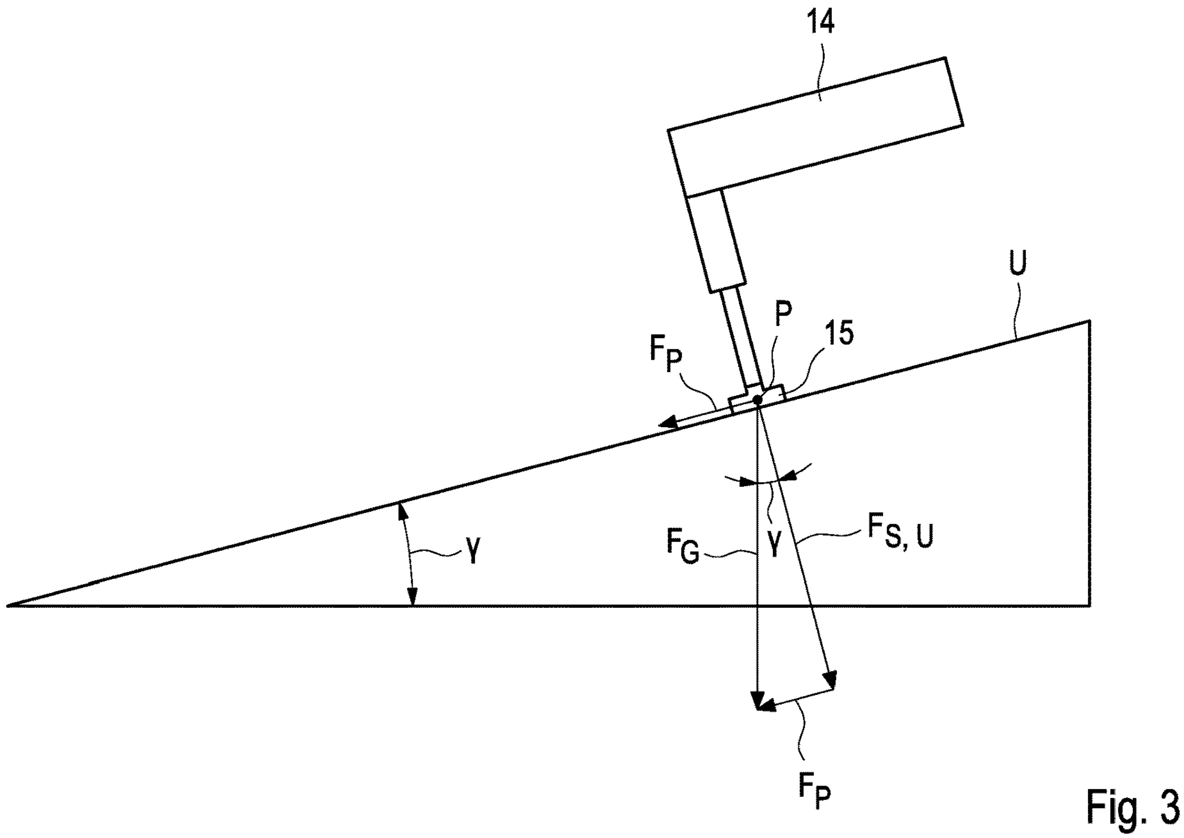
FIG. 3 shows, in an enlarged schematic view, an illustration of the force actions on a support leg in the case of support on inclined underlying surface in lateral sectional view along section line III-III of FIG. 2.

Furthermore, the transverse force on the support legs 14 can be checked, in particular with strongly inclined machine setup (>3°). For all support legs 14, it is checked whether a permissible comparative load (combination of horizontal force and vertical force on the support leg 14) is exceeded. If this is the case, the machine can no longer be moved in such a way that the critical load (for example, the load torque and/or the transverse force on a support leg with extreme inclination or the like) increases. This is outlined by way of example in FIGS. 3 and 4: FIG. 3 shows an enlarged detail around a support point P of a support leg 14 on an inclined underlying surface U according to section line III-III from FIG. 2. The inclination of the underlying surface U along the plane through the support leg 14 is indicated by γ. The force relationships at the support point P are illustrated with the aid of a force parallelogram, which is routine for a person skilled in the art.

A gravitational force engaging at the support point P of the support leg 14 (i.e., the fraction of the total gravitational force of the mobile concrete pump on the support leg 14) is identified pointing vertically downward by $F_G$. This force may be broken down in the illustrated plane of section through the support leg 14 into a perpendicular force component $F_{S,U}$ extending perpendicularly to the underlying surface U and a parallel force component $F_P$ extending in parallel to the underlying surface U. The parallel force component $F_P$ represents the downhill force engaging in the support leg direction at the angle of inclination γ.

Figure 4:
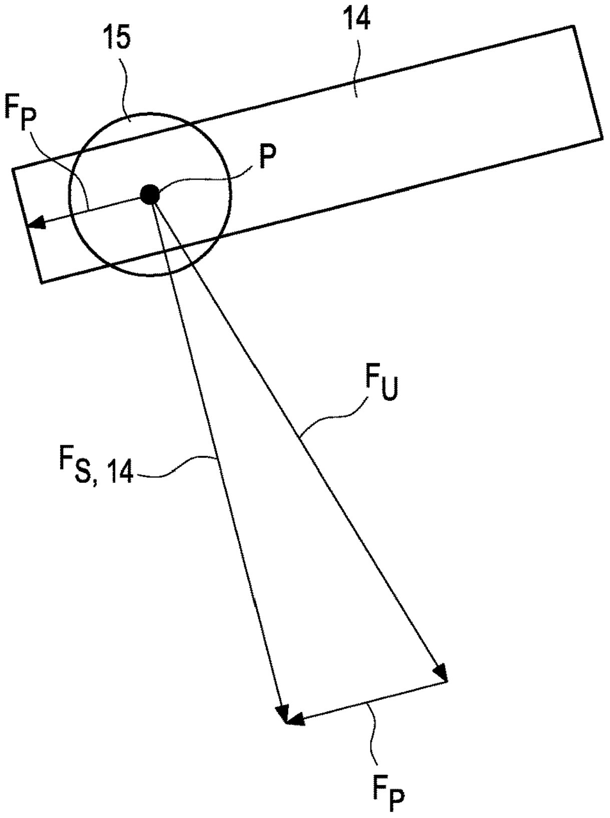
FIG. 4 shows, in an enlarged schematic view, an illustration of the force actions on the support leg of FIG. 3 in a top view.

FIG. 4 schematically shows by way of example a further division of this downhill force $F_P$ into a component in parallel to the overall underlying surface inclination (defined by the angles γ and α) and a component perpendicular to the support leg 14 in a top view. A force component extending in parallel to the overall inclination of the underlying surface (i.e., in consideration of the longitudinal angle of inclination α and the angle of inclination in the support leg direction γ) and engaging at the support point P is identified by $F_U$. It is composed of the parallel force component $F_P$ and a component $F_{S,14}$ extending perpendicular to the support leg 14. These components $F_P$ and $F_{S,14}$ are the forces actually engaging at the support point P in the direction of the support leg and transversely to the support leg.

Finally, the torque can be checked at the rotating mechanism gear, also in particular with strongly inclined machine setup (>3°). The mast 18 now cannot be rotated in fully extended position with maximum load torque without overloading the rotating mechanism 16. The torque required for rotating the mast is calculated; if it is greater than the boom torque, movement that increases the torque can no longer be executed.

The invention also enables a so-called pumping prediction, i.e., an indication as to whether pumping could also be performed in the given mast position. For this purpose, the theoretical maximum load torque in the case of the present mast position and substructure inclination is calculated in parallel thereto, by determining the load torque at maximum conveyor pipe weight using the known angles and the masses known from the machine specification. Reliable assumptions on the fill level in the funnel 24 and in the water tank have to be made for this purpose.

Building thereon, safety coefficients for the critical systems (for example, stability, leg overload, and torque on the rotating mechanism) can be calculated (safety-critical part of the control) in each case for the present situation (mast position, operating loads, and inclination).

In addition, non-safety-critical safety coefficients can also be calculated in the present mast position and inclination with maximum operating loads on the arm (for example, statements with respect to "can I also pump in this setup situation and/or arm position and/or inclination?". They are used only to inform the operating personnel and have no consequences in the control.

A display can be provided for the operating personnel, in which in each case only the minimal safety factor for present load and maximum load is displayed. The machine operator can thus see whether he can also pump in the present position, and the machine unexpectedly rejecting this as a load-torque-increasing process is avoided.

FIGS. 5 to 8 show exemplary illustrations of generating a display for the operating personnel.

Figure 5:
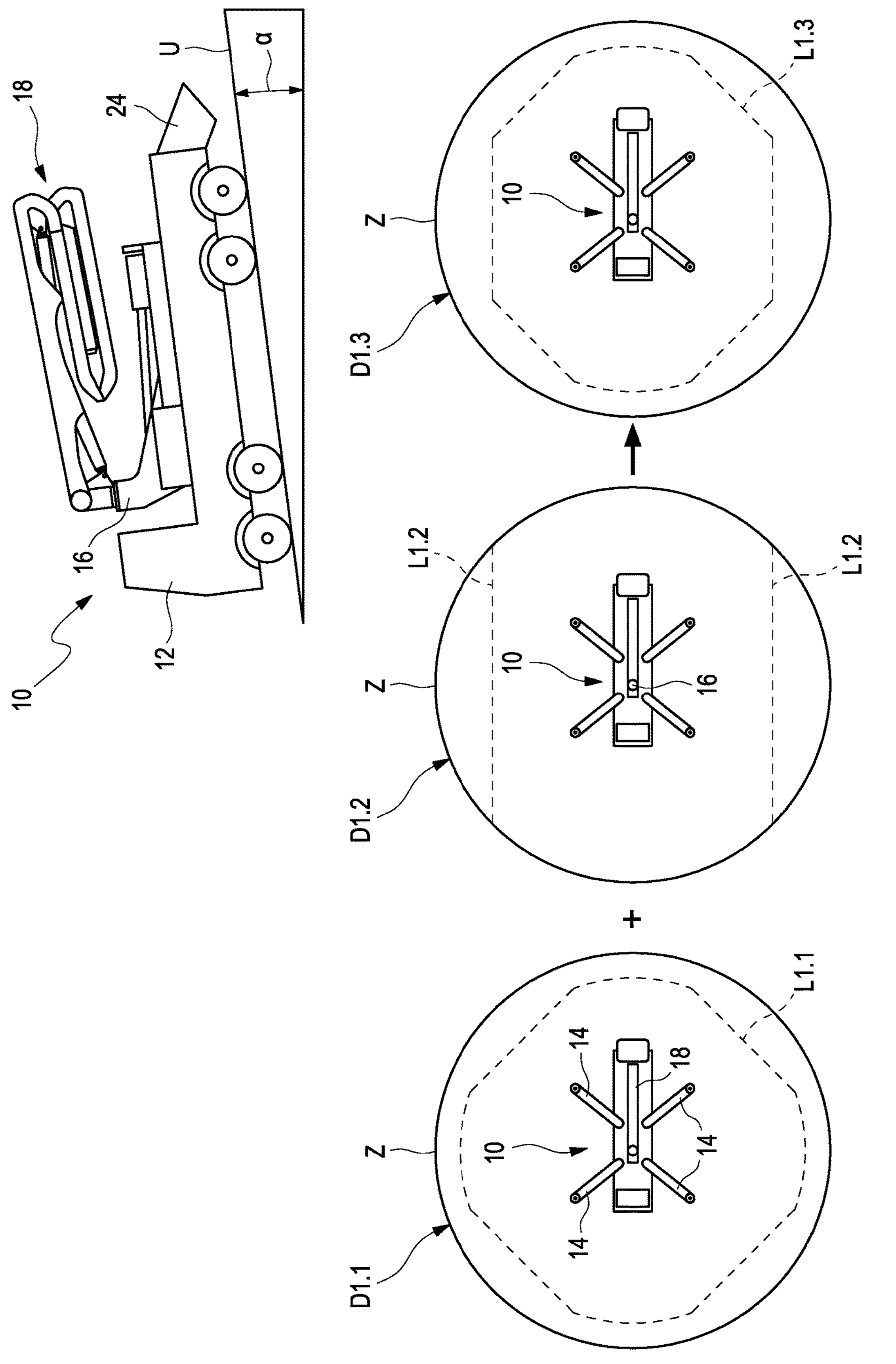
FIG. 5 shows an exemplary schematic illustration of the permissible mast torque in the case of extreme inclination and full support of a mobile concrete pump with inclination in the longitudinal direction.

FIG. 5 shows an exemplary illustration of a permissible mast torque in the case of extreme inclination α in the longitudinal direction L of the mobile concrete pump 10 with full support (i.e., with fully extended support legs 14). The illustration of FIG. 5 shows how a visual display of an overall restriction of the movement radius of the mast structure 18 of the mobile concrete pump 10 is composed of a consideration of partial restrictions. In a first image D1.1, the mobile concrete pump 10 is shown very schematically having completely extended support legs 14 in a top view, surrounded by a solid circular line Z, which represents the permissible torque with level (i.e., inclination-free) full support (ideal case). The circular line Z thus represents the maximum action circle of the mobile concrete pump. In the first image D1.1, moreover the restriction of the action circle due to impermissible support leg longitudinal and transverse forces (cf. FIGS. 3 and 4) in the specific inclination of the machine is shown by dashed line L1.1. A second image D1.2 shows, using dashed lines L1.2, the restriction of the action circle due to increased rotating mechanism torques in the specific inclination of the machine, and a third image D1.3 shows, using dashed line L1.3, the superposition of the restrictions L1.1 and L1.2, thus the limit of the maximum permissible torque with present support and inclination.

Figure 6:
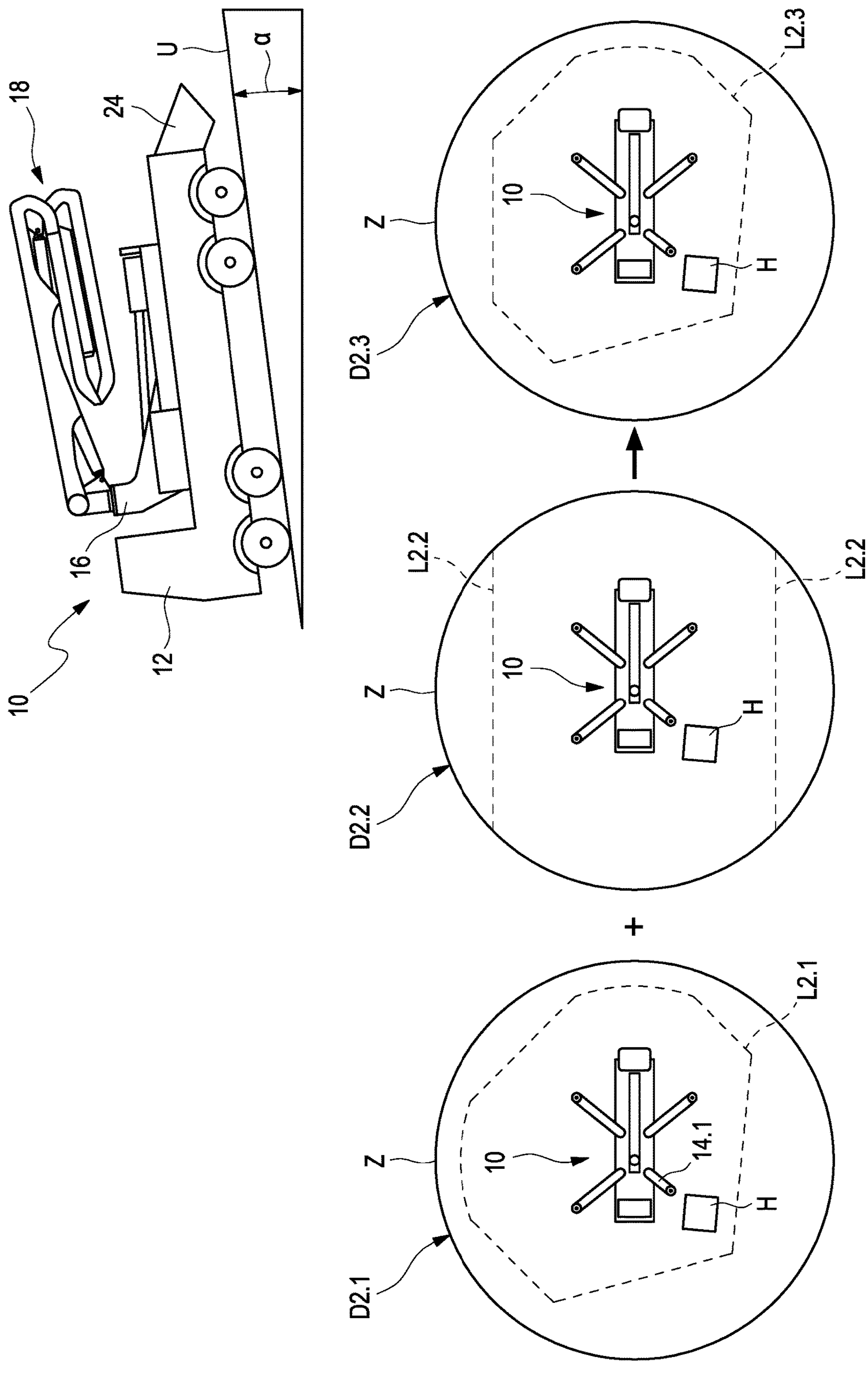
FIG. 6 shows an exemplary schematic illustration of the permissible mast torque in the case of extreme inclination and partial support of a mobile concrete pump with inclination in the longitudinal direction.

FIG. 6 shows, in a similar illustration, a mobile concrete pump 10 in the same inclination in the longitudinal direction, but in partial support. As is apparent from a first image D2.1, due to an obstacle H, one support leg 14.1 is only partially extended, while the remaining support legs are completely extended. A changed restriction of the action circle (dashed line L2.1) results therefrom due to impermissible support leg longitudinal and transverse forces, since the only partially extended support leg 14.1 can only assume a lesser support fraction, so that in a region at the bottom left in the illustration an extension of the mast arm 18 is very restricted. A second image D2.2 again shows, using dashed lines L2.2, similarly to the second image of FIG. 5, the restriction of the action circle due to increased rotating mechanism torques in the specific inclination and partial support of the machine (unchanged from FIG. 5), and a third image D2.3 again shows, using dashed line L2.3, the superposition of the restrictions L2.1 and L2.2, therefore the limit of the maximum permissible load torque with current (partial) support and inclination.

Figure 7:
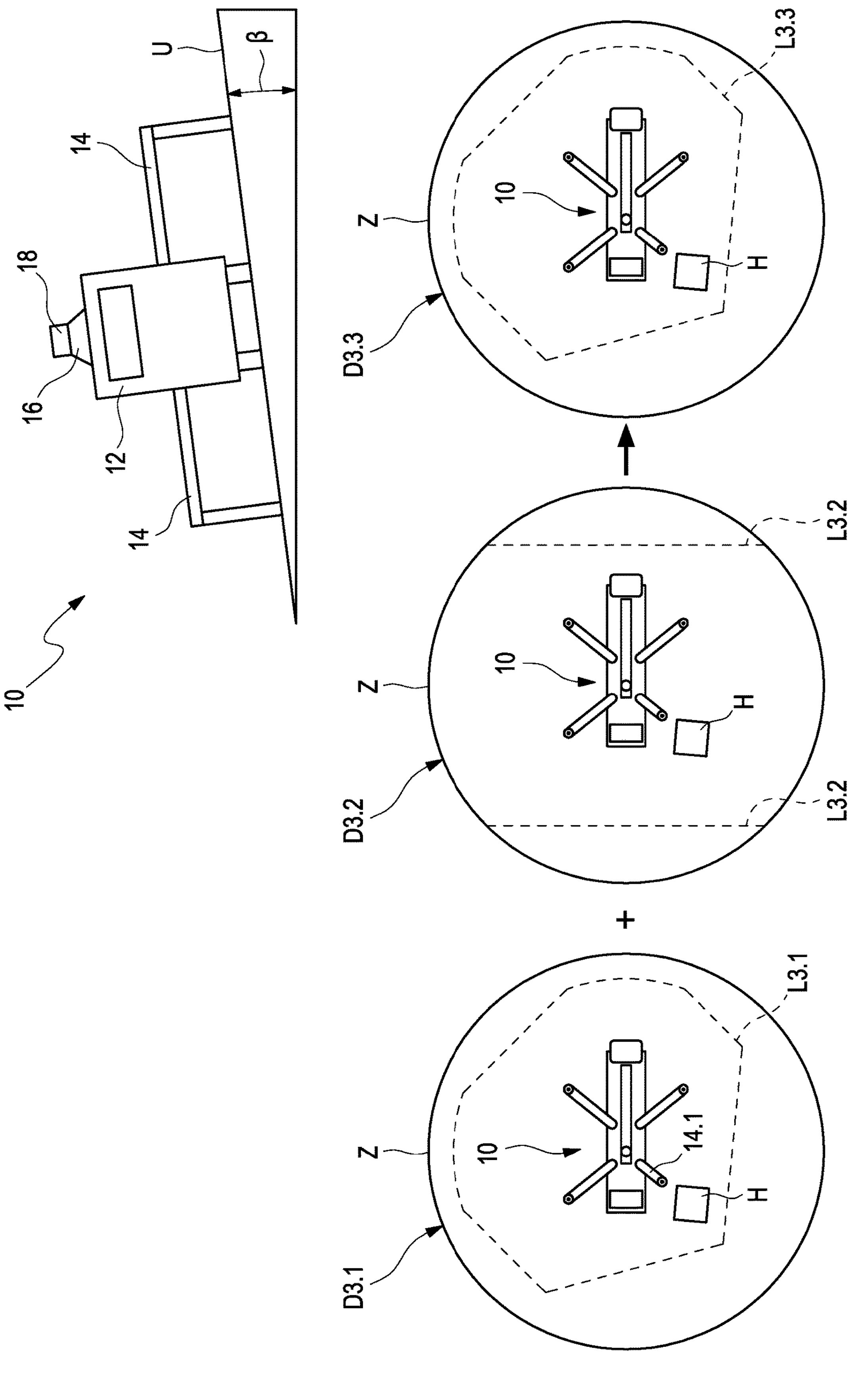
FIG. 7 shows an exemplary schematic illustration of the permissible mast torque in the case of extreme inclination and partial support of a mobile concrete pump with inclination in the transverse direction.

Finally, FIG. 7 shows, in a similar manner on the basis of three images D3.1, D3.2, D3.3, the restriction conditions with partial support corresponding to the situation in FIG. 6, but with inclination of the mobile concrete pump 10 in the transverse direction (direction transverse to the longitudinal axis L, inclination β). This results in an unchanged action circle upon consideration of the support leg longitudinal and transverse forces (line L3.1 in image D3.1), but a changed action circle from the illustration of FIG. 6 with respect to the restriction due to increased engine torques (due to the changed inclination) according to the dashed line L3.2 in image D3.2. A somewhat changed superposition of the action circles accordingly results, as illustrated by the dashed line L3.3 in image D3.3.

Figure 8:
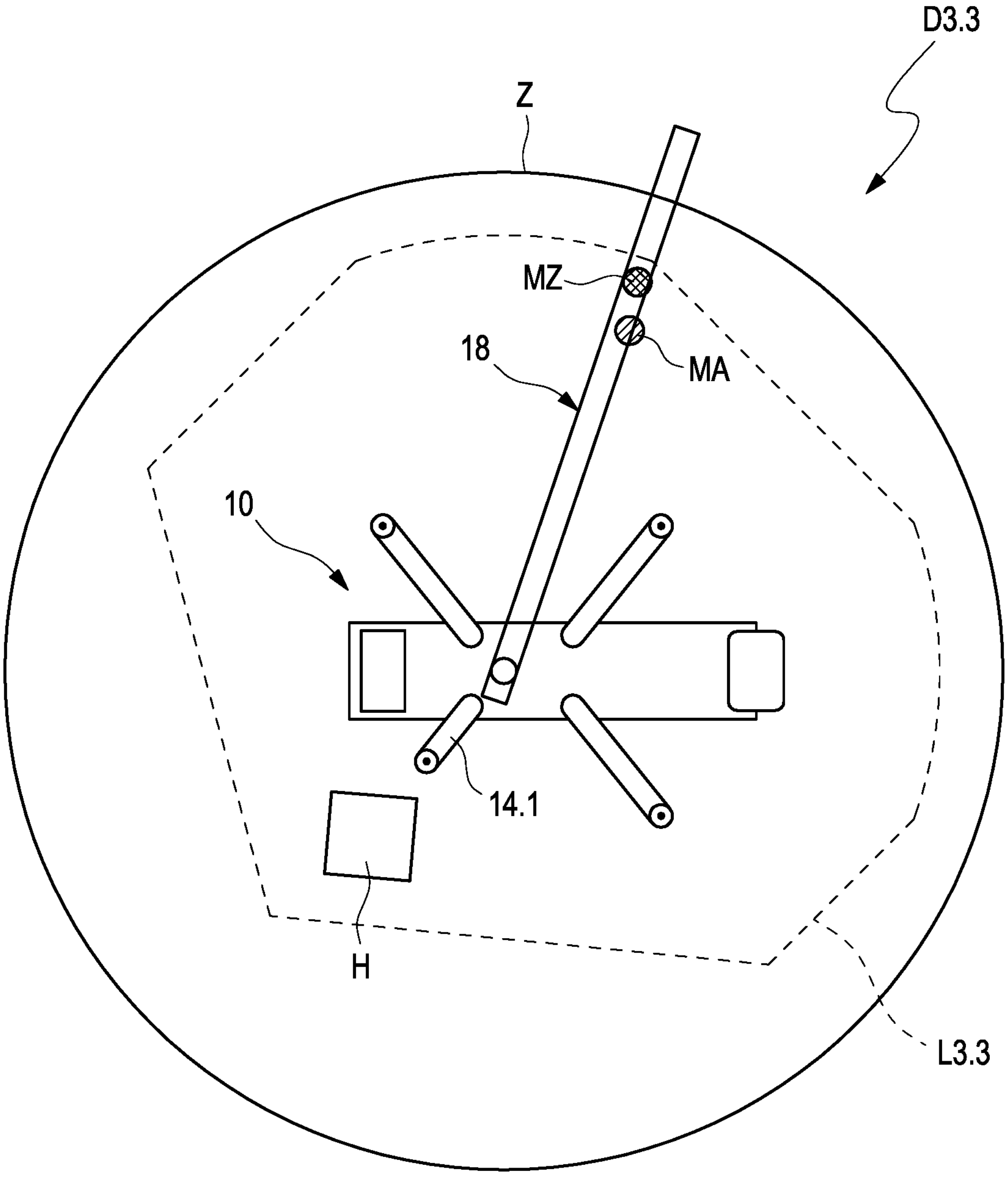
FIG. 8 shows an exemplary schematic illustration of an operating display.

FIG. 8 shows, on the basis of the example of the load torque conditions of the third image D3.3 of FIG. 7 (i.e., partial support due to the obstacle H and inclination β transverse to the longitudinal axis L), a possible display representation for operating personnel having extended mast arm 18, which is pivoted out by approximately 70° in relation to its idle position on the mobile concrete pump 10 in the illustration of FIG. 8. The display moreover gives the operator an indication of the location of the load torque with present loading of the mobile concrete pump and the delivery hose of the mast arm. In the exemplary embodiment of FIG. 8, this is a circular display MA shown along the representation of the mast arm 18, which is located within the action circle represented by the dashed line L3.3. It is thus signaled to the operator that the mobile concrete pump 10 operates in the noncritical (green) range. The display MA can accordingly be, for example, in green. For further information for the operator, a display MZ can additionally be provided, which represents the location of the load torque with maximum permissible loading in this mast position. This display MZ can also be shown along the representation of the mast arm 18. Since it is a limiting specification (maximum permissible load in the specific mast arm position), it is also within the action circle of the line L3.3. The distance between the two displays MA and MZ signals to the operator whether and how much concrete can still be pumped into the conveyor hose of the mast arm.

Possible types of calculation are illustrated hereinafter as an exemplary embodiment.

The load torque can be calculated from the cylinder pressures according to $$F_{A\text{-}}F_{A\text{-}cylinder} = P_{Acylinder\ base} - A_{Acylinder\ base} - P_{Acylinder\ rod} * A_{Acylinder\ rod}$$

$$M_{load} = F_{A\text{-}cylinder} * \text{Lever}(\varphi_{opening\ A\ joint})$$

The factor "lever" in the last-mentioned equation represents a proportionality factor dependent on the joint position (i.e., on the present joint opening angle φ) of the A joint (i.e., the joint of the first mast arm 20.1 (A arm) with respect to the rotating mechanism 16), which indicates the ratio between joint torque $M_{Load}$ and the measured cylinder force $F_{A\text{-}Cylinder}$, and can be calculated in real-time from the geometry. Alternatively, a characteristic map or an algebraic equation can be stored in the controller. Furthermore, the cylinder force can alternatively be directly measured.

The maximum possible load torque in the present position can then be calculated from the arm position. If the mobile concrete pump comprises a sensor system which can determine the position of the mast, it is additionally possible to determine how large the load torque would be if the conveyor pipe were filled with concrete of the maximum density.

$$\text{Center of gravity}_{Arm1} = \text{End point}_{rotating\ mechanism} + \text{Rotational matrix}(\varphi_{Arm1}) * \text{Center of gravity}_{Arm1\ local}$$

$$\text{End point}_{Arm1} = \text{End point}_{rotating\ mechanism} + \text{Rotational matrix}(\varphi_{Arm1}) * \text{End point}_{Arm1\ local}$$

$$\text{Center of gravity}_{Arm2} = \text{End point}_{Arm1} + \text{Rotational matrix}(\varphi_{Arm2}) * \text{Center of gravity}_{Arm2\ local}$$

$$\text{End point}_{Arm2} = \text{End point}_{Arm1} + \text{Rotational matrix}(\varphi_{Arm2}) * \text{End point}_{Arm2\ local}$$

...

$$M_{load,max} = \sum_{all\ arms+end\ hose} \text{Center of gravity}_{Arm} * m_{Arm,max} * g$$

The centers of gravity and endpoints of the individual arms are stored in tabular form, as are the masses thereof with and without concrete in the line.

If the following calculation is carried out using this load torque, it can be specified whether pumping can be performed in the present mast position. If the sensor system of the mast position determination is safety oriented, this torque can thus be used, however, overloads of the concrete pump (for example, due to heavy concrete) are not recognized.

Machine intrinsic weight and center of gravity are determined next. The arm weight is not incorporated into the calculation (as is also recognized hereinafter), but the total weight and the load torque are. To estimate the total weight of the machine, the minimum possible arm weight is always to be calculated conservatively in the calculation.

When the maximum possible load torque determined as above is used for calculation, this corresponds to the filled conveyor pipe on the distributor mast (otherwise the load torque would be less).

If the load torque previously determined from the measured cylinder pressures is used for calculation, the minimum arm weight which can generate the measured load torque has to be taken into consideration. That is to say, the arm mass in the case of low load torque having the minimal arm mass is only raised to the value necessary for generating the torque if the fully extended arm could no longer generate the load torque without payload. Of course, it is also possible to always calculate conservatively using the minimal arm mass (to derive the center of gravity of the boom arm arrangement the lighter the arm at equal load torque, the farther "outward" the center of gravity is located).

Furthermore, the total mass of the substructure (or entire vehicle) and the center of gravity of the substructure are important. Both are typically measured "empty" for each machine (once in the factory) and can be maintained in the controller.

In addition, the position of the support legs 14 is important for the substructure mass properties. These positions are known by way of the typical sensor system SB, for example, the ESC sensor system of the applicant, so that the center of gravity thereof can be calculated in the controller and the substructure center of gravity can be corrected accordingly.

In addition, the concrete weight in the funnel 24 of the concrete pump 10 and the water in the water tank can also be taken into consideration. Depending on the mast position, the worst case can/should be used for calculation in each case (funnel empty when the arm protrudes forward, funnel full when pumping is performed to the rear). A fill level measurement would also be conceivable in the water tank, wherein pumping the tank empty would then have to be locked depending on the support.

Finally, the calculation of the support leg forces is performed. The load torque can be divided in the coordinate directions (it is unimportant here from which calculation method it originates).

$$M_{load_z} = -\cos(\text{Rotating mechanism}) * M_{load}$$

$$M_{load_x} = -\sin(\text{Rotating mechanism}) * M_{load}$$

The forces in the support legs 14 can be approximately calculated according to the laws of static strength of materials:

$$\sum F_y = m_{vehicle} * g - \sum_{all\ support\ legs} F_{support\ leg\_y} = 0$$

$$\sum M_x = F_{g_{substructure}} * s_{substructure_z} + \left[m_{Mast} * g * Pos_{rotating\ head_z} + M_{load_x}\right] + \sum_{all\ support\ legs} F_{support\ leg_y} * Pos_{support\ leg_z} = 0$$

$$\sum M_z = F_{g_{substructure}} * s_{substructure_z} + \left[m_{Mast} * g * Pos_{rotating\ head_y} + M_{load_y}\right] + \sum_{all\ support\ legs} F_{support\ leg_y} * Pos_{support\ leg_y} = 0$$

In the typical coordinate system selection, the position of the rotating head or rotating mechanism 16 is at the coordinate origin, so that the mast weight falls out of the equations. Only the total weight of the machine and the substructure weight having center of gravity are incorporated into the equations.

If more than three support legs 14 are in contact with the ground, the system is overdetermined, a unique solution is then not possible. Therefore, spring constants can be assumed for the support legs to calculate the forces. In addition, it is assumed that the machine 10 stands in the (inclined) plane. For each further support leg (in the case of four support legs there is only one further one, however, cases having further support legs are also conceivable) the following condition also has to be met:

$$(\overrightarrow{a_{\text{supportlegn}}} - \overrightarrow{a_{\text{supportleg1}}}) * [(\overrightarrow{a_{\text{suportleg2}}} - \overrightarrow{a_{\text{supportleg1}}}) \times (\overrightarrow{a_{\text{supportleg3}}} - \overrightarrow{a_{\text{supportleg1}}})] = 0$$

The following applies for each support leg:

$$\overrightarrow{a_{support\ leg}} = \begin{pmatrix} Pos_{support\ leg\_x} \\ Pos_{support\ leg_y} + \dfrac{F_{support\ leg_y}}{c_{support\ leg_y}} \\ Pos_{support\ leg\_z} \end{pmatrix}$$

If a negative value results for a force in this calculation, this is a sign that the relevant support leg lifts off. This support leg is then removed from the calculation and the equation system is solved using one fewer support leg.

The rigidities of the support legs are dependent in the general case on the extension length and the construction of the substructure; a constant, a characteristic map, or an approximation formula can alternately be selected here, which are either determined in the mechanical design or experimentally.

An alternative formulation which supplies the support forces in all spatial directions would be the determination of the support forces using a simplified finite element model (FEM). In the simplest case, it consists of four bar elements, to which forces and torques are applied which have previously been converted to the rotating mechanism center point. All loads from intrinsic weight, mast, operating loads, etc. are summarized in these forces and torques.

The permissible limits are now checked for all significant components of the concrete pump. The checks are illustrated here by way of example for several components.

In the stability calculation or stability check it is checked how large the fraction of the vertical forces is which is dissipated only via two support points. If a limiting value (for example, 95%) is exceeded, the machine is in danger of tipping, and all actions which cause the load torque to increase have to be avoided (for example and in particular moving the mast joints into more unfavorable positions, moving the rotating mechanism into a more unfavorable position, forward pumping using the core pump, etc.).

During the check of the load of the support legs 14, it is assumed that with straight setup of the machine, the transverse forces in the x and/or z direction correspond to a fraction of wind factor on the contact forces, assumptions of 1% to 5% are reasonable. If the machine is set up obliquely, the transverse forces increase approximately with the sine of the tilt angle:

$$F_{support\ leg_x} = F_{support\ leg_y} * \text{Windfactor} + |\sin \text{Inclination}_z| * F_{support\ leg_y}$$

$$F_{support\ leg_z} = F_{support\ leg_y} * \text{Windfactor} + |\sin \text{Inclination}_x| * F_{support\ leg_y}$$

A comparison degree of utilization of the support legs 14 is determined from the forces with the aid of constants. The constants can be determined, for example, in the FEM design or experimentally. For example, the following applies:

$$\text{Degree of utilization}_{support\ leg} = F_{support\ leg_x} * S_x + F_{support\ leg_y} * S_y + F_{support\ leg_z} S_z \leq 1$$

If the above inequality is met for all support legs 14, the present angle is permissible.

It can be reasonable for the safety factors $S_x$ to $S_Z$ in the equation to be dependent on the present position of the respective support leg. The safety factors can be determined in the design in the FE system or experimentally.

A check of the torque on the rotating mechanism gear is performed in particular upon setup of the machine at an inclination >3°. The mast now cannot be rotated into every position in the fully extended position with maximum load torque, without overloading the rotating mechanism and therefore also the mast. Therefore, the torque required for rotating the mast is calculated; if it is higher than the boom torque, movement which increases the torque can no longer be executed.

$$M_{rotating\ mechanism} = M_{load_x} * (|\sin \text{Inclination}_z| + S_{rotating\ mechanism}) + M_{load_z} * (|\sin \text{Inclination}_x| + S_{rotating\ mechanism})$$

$$M_{rotating\ mechanism} \leq M_{rotating\ mechanism\ permissible}$$

Safety features are included in the factor $S_{Rotating\_mechanism}$, inter alia, wind forces can be taken into consideration here. It would also be theoretically possible to determine this factor at the runtime (anemometer), but a susceptibility to variable weather conditions would be given.

If the measurement of the arm positions or a use of these measurement results does not take place, stability monitoring is still possible, but without a statement about the stability with maximum load.

If the present arm position is determined using a safety sensor system, the maximum load torque with full load can be calculated from these signals. It can thus always be calculated whether the machine can also pump in this position, a determination of the present A joint torque becomes unnecessary.

If the stability is implemented via the measurement of the present tipping safety, the arm angles additionally have to be analyzed for the stability with maximum loading. Since this information is not safety-critical, however, this can be performed using a non-safety-oriented mast sensor system, and the specification of whether the machine can also still pump in the position is displayed solely for information.

The stability calculation can thus either be carried out from the measurement of the positioning cylinder pressure (A cylinder), the opening angle of the A arm, the rotating mechanism angle δ, and a measurement of the positions of the support legs (plus a center of gravity calculation from the (uncertain) joint angle measurement for calculating the maximum A joint torque and the support leg positions)

from the measurement of the support forces (plus a center of gravity calculation from the (uncertain) joint angle measurement to calculate the maximum A joint torque and the support leg positions)

from a measurement of the cylinder force or a bolt force (to avoid measurement problems in the end positions) linked to the calculation of the maximum A joint torque (from the measurement of the joint angle and the rotating mechanism angle δ).

According to the invention, an unnecessary restriction of the working range of a mobile concrete pump is avoided even with strongly inclined setup. It is also possible to work outside the present, safe working region with shortened range. A pumping prediction can take place in the operating display. Furthermore, an increase of the permissible angle of inclination (for example, 10°) of the machine is possible; if necessary the range is restricted by the controller.

The invention claimed is:

1. A mobile concrete pump having a chassis having extendable support legs, and a concrete distributor mast, which is rotatable and adjustable in inclination by means of a positioning cylinder on a rotating mechanism of the chassis, and which comprises multiple pivotable mast arms, and a processing unit to carry out a stability calculation incorporating vertical and/or horizontal forces on at least two of the extendable support legs, and having a control unit, which is configured to limit the initiation of a pumping procedure in dependence on the stability calculation, and having sensors for detecting vertical and/or horizontal forces on the at least two extendable support legs, wherein the stability calculation is carried out on the basis of a load torque and the measured vertical and/or horizontal forces.

2. A mobile concrete pump comprising:

a chassis having extendable support legs, at least two of the extendable support legs having support points;

a concrete distributor mast, which is rotatable and adjustable in inclination by means of a positioning cylinder on a rotating mechanism of the chassis, and which comprises multiple pivotable mast arms;

a support sensor system (SB) for detecting a position of the support points of the at least two extendable support legs;

inclination sensors (SN) for detecting the inclination of the chassis around two axes;

a cylinder pressure sensor (SZ) for detecting a pressure in the positioning cylinder;

a rotational angle sensor (SD) for detecting a rotational angle of the rotating mechanism; and a processing unit to carry out a stability calculation and having a control unit which limits one for more of a rotational movement on the rotating mechanism, a pivot movement of at least one of the pivotable mast arms, and the initiation of a pumping procedure in dependence on the stability calculation, wherein the stability calculation is carried out on the basis of a load torque and a calculation of the vertical and/or horizontal forces on the at least two extendable support legs based on the position of the support legs, the inclination of the chassis, the pressure in the positioning cylinder, and the rotational angle of the rotating mechanism.

3. The mobile concrete pump of claim 1, in which a calculation is performed of a fraction of vertical forces which are dissipated only via the at least two extendable support legs.

4. The mobile concrete pump of claim 1, in which a check is performed of the load of the at least two extendable support legs by calculating a comparison degree of utilization incorporating transverse forces acting on the at least two extendable support legs.

5. The mobile concrete pump of claim 1, in which in particular in the case of a setup having an inclination of the chassis by greater than 3°, calculation of a torque required for rotating the concrete distributor mast and a comparison of said torque to a boom torque is performed.

6. The mobile concrete pump of claim 1, which furthermore comprises a user interface, via which a display is performed as to whether a pumping procedure can be initiated in a given mast position.

7. The mobile concrete pump of claim 2, in which a load torque is calculated from the cylinder pressure.

8. A method for the stabilization-relevant control of a mobile concrete pump having a chassis having extendable support legs and on which a concrete distributor mast formed from multiple pivotable mast arms is arranged so it is rotatable on a rotating mechanism and is adjustable in inclination by means of a positioning cylinder, in which initiation of a pumping procedure is limited in dependence on a stability calculation incorporating vertical and/or horizontal forces on at least two of the extendable support legs wherein a stability calculation is carried out on the basis of a load torque and on the basis of values of vertical and/or horizontal forces on the at least two extendable support legs measured by a support sensor system (SB).

9. The method of claim 8, in which the stability calculation is carried out on the basis of a calculated load torque.

10. The method of claim 8, in which the support sensor system (SB) detects support points of the at least two extendable support legs, a calculation of the vertical and/or horizontal forces on at the least two extendable support legs is carried out from measured values of the support points of the at least two extendable support legs, inclination sensors (SN) for detecting an inclination of the chassis around two axes, a sensor (SZ) for detecting a pressure in the positioning cylinder (cylinder pressure sensor), and/or a rotational angle sensor (SD) for detecting a rotational angle of the rotating mechanism.

11. The method of claim 8, in which it is displayed via a user interface whether a pumping procedure can be initiated in a given mast position.

12. The method of claim 9, in which the load torque is calculated from a pressure in the positioning cylinder.

13. The method of claim 8, in which a fraction is calculated of vertical forces which are dissipated only via the at least two extendable support legs.

14. The method of claim 8, in which to check a load of the support legs, a comparison degree of utilization is calculated based on the transverse forces acting on the at least two extendable support legs.

15. The method of claim 8, in which in the case of a setup having an inclination of the chassis by greater than 3°, a torque required for rotating the concrete distributor mast is calculated and compared to a boom torque.

16. A non-transitory computer readable medium comprising instructions to carry out the method of claim 8 when the instructions are executed on a computer, a processor, or a corresponding processing unit of a mobile concrete pump.

17. A mobile concrete pump comprising:

a chassis having extendable support legs;

a concrete distributor mast, which is rotatable and adjustable in inclination by a positioning cylinder on a rotating mechanism of the chassis, and which comprises multiple pivotable mast arms;

a processing unit to carry out a stability calculation on the basis of vertical and/or horizontal forces on at least two of the extendable support legs; and a control unit configured to limit a rotational movement of the rotating mechanism and/or a pivot movement of at least one mast arm and/or the initiation of a pumping procedure in dependence on the stability check, wherein the processing unit calculates a theoretical maximum load torque with a present mast position and inclination of the chassis.

18. A method for the stabilization-relevant control of a mobile concrete pump comprising:

a chassis having extendable support legs;

a concrete distributor mast formed from multiple pivotable mast arms rotatable on a rotating mechanism connected to the chassis, said concrete distributor mast adjustable in inclination by a positioning cylinder, in which a rotational movement of the rotating mechanism and/or a pivot movement of at least one mast arm and/or initiation of a pumping procedure is limited in dependence on a stability calculation performed on the basis of vertical and/or horizontal forces on at least two of the extendable support legs, in which a theoretical maximum torque is calculated with a present mast position and inclination of the chassis.

19. A non-transitory computer readable medium comprising instructions to carry out the method of claim 18 when the instructions are executed on a computer, a processor, or a corresponding processing unit of a mobile concrete pump.

* * * * *